(12) United States Patent
Sodagar

(10) Patent No.: US 11,743,307 B2
(45) Date of Patent: Aug. 29, 2023

(54) NONESSENTIAL INPUT, OUTPUT AND TASK SIGNALING IN WORKFLOWS ON CLOUD PLATFORMS

(71) Applicant: TENCENT AMERICA LLC, Palo Alto, CA (US)

(72) Inventor: Iraj Sodagar, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 176 days.

(21) Appl. No.: 17/352,616

(22) Filed: Jun. 21, 2021

(65) Prior Publication Data

US 2021/0400097 A1 Dec. 23, 2021

Related U.S. Application Data

(60) Provisional application No. 63/087,751, filed on Oct. 5, 2020, provisional application No. 63/087,746, filed on Oct. 5, 2020, provisional application No. 63/087,748, filed on Oct. 5, 2020, provisional application No. 63/042,480, filed on Jun. 22, 2020.

(51) Int. Cl.
*H04L 65/60* (2022.01)
*H04L 69/06* (2022.01)

(52) U.S. Cl.
CPC ............. *H04L 65/60* (2013.01); *H04L 69/06* (2013.01)

(58) Field of Classification Search
CPC ....... H04L 65/60; H04L 69/06; H04L 65/765; G06F 9/5027; G06F 8/10; G06F 9/5072; H04N 21/2353
See application file for complete search history.

(56) References Cited

U.S. PATENT DOCUMENTS

| 2007/0211743 | A1 | 9/2007 | Zwernemann et al. |
| 2012/0300854 | A1 | 11/2012 | Chen et al. |
| 2018/0367506 | A1 | 12/2018 | Ford et al. |
| 2019/0036836 | A1 | 1/2019 | Le et al. |
| 2019/0087359 | A1 | 3/2019 | Litichever et al. |

(Continued)

FOREIGN PATENT DOCUMENTS

WO 2020/080956 A1 4/2020

OTHER PUBLICATIONS

"Information technology—Coded representation of immersive media—Part 8: Network Based Media Processing" ISO23090-8-2018(E); ISO/IEC JTC1/SC 29/WG11, ISO 2018 (Year: 2018).*

(Continued)

*Primary Examiner* — Caroline H Jahnige
(74) *Attorney, Agent, or Firm* — Sughrue Mion, PLLC

(57) ABSTRACT

Systems and methods for managing a Network Based Media Processing (NBMP) workflow are provided. A method includes a method performed by at least one processor is provided. The method includes: deriving the NBMP workflow; obtaining at least one first syntax element indicating that at least one task included in the NBMP workflow, at least one input received by the at least one task, or at least one output generated by the at least one task, is nonessential; determining a plurality of essential tasks based on the at least one first syntax element; and assigning the plurality of essential tasks to at least one from among a media sink, a media source, and a media processing entity included in the NBMP workflow.

16 Claims, 9 Drawing Sheets

(56) References Cited

U.S. PATENT DOCUMENTS

2020/0177694 A1* 6/2020 Kolan ............... H04L 65/65
2021/0004273 A1* 1/2021 You ................. G06F 9/5027
2021/0390318 A1* 12/2021 You ................. G06T 7/11
2022/0167026 A1* 5/2022 You ................. G06F 9/5038

OTHER PUBLICATIONS

International Search Report dated Sep. 24, 2021, issued by the International Searching Authority in application No. PCT/US 21/38472.
Written Opinion dated Sep. 24, 2021, issued by the International Searching Authority in application No. PCT/US 21/38472.
"Text of ISO/IEC FDIS 23090-8 Network-based media processing", International Organization for Standardization Organization Internationale de Normalization ISO/IEC JTC1/SC29/WG11 Coding of Moving Pictures and Audio, ISO/IEC JTC1/SC29/WG11 N19062, Jan. 2020, 105 pages, Brussels, BE.
"ISO/IEC 23090-8 CAMD 1 NBMP Function Templates", ISO/IEC JTC 1/SC 29/WG 11, 2020, Coding of moving pictures and audio, Conveniorship: UNI (Italy), N19283, ISO/IEC 23090-8:2020/CDAM1 (85 pages total).
Extended European Search Report dated Jan. 30, 2023 in European Application No. 21828825.6.

\* cited by examiner

NONESSENTIAL INPUT, OUTPUT AND TASK SIGNALING IN WORKFLOWS ON CLOUD PLATFORMS

CROSS-REFERENCE TO THE RELATED APPLICATIONS

This application claims priority from U.S. Provisional Application No. 63/042,480, filed on Jun. 22, 2020; U.S. Provisional Application No. 63/087,746, filed on Oct. 5, 2020; U.S. Provisional Application No. 63/087,748, filed on Oct. 5, 2020; and U.S. Provisional Application No. 63/087, 751, filed on Oct. 5, 2020; the disclosures of which are incorporated herein by reference in their entirety.

FIELD

Embodiments of the present disclosure are directed to Moving Picture Experts Group (MPEG) Network Based Media Processing (NBMP) and, more particularly, to managing an NBMP workflow.

BACKGROUND

MPEG Network Based Media Processing (NBMP) project has developed a concept of processing media on cloud. The NBMP Draft International Specification shows a great potential to increase media processing efficiency, faster and lower-cost deployment of media services, and the ability to provide large scale deployment by leveraging the public, private or hybrid cloud services.

However, the current NBMP specification does not distinguish between the tasks that are essential for the workflow and the ones that are not essential.

Further, while the division of media streams with equal duration segments is useful for many applications, in some applications the duration of segments may vary due to different reasons. Therefore fixed duration segments would not work in these cases.

In addition, the NBMP standard defines a step descriptor for processing media in temporal segments independent from each other, or in parallel. While the division of media streams in time is the first level of parallelism, for large video or volumetric data, segmentation in other dimensions can further provide more parallelism or independent processing of media data and enabling using more parallel tasks/microservices for processing the data. Such multidimensional parallelism is insufficiently addressed in the NBMP standard.

In addition, the NBMP standard defines Workflow Description to define the processing required. However, the exclusion of some of the function instances is not possible with the current design. While NBMP Workflow Description provides a detailed requirement for running a workflow, it does not allow the exclusion of some function instances from the descriptions that are applied to the entire workflow.

SUMMARY

The NBMP Draft International Specification shows a great potential to increase media processing efficiency, to provide faster and lower-cost deployment of media services, and to have the ability to provide large scale deployment by leveraging public, private, or hybrid cloud services.

Embodiments of the present disclosure provide a mechanism to implement various changes in the NBMP standard.

In embodiments, there is provided a signaling mechanism to identify nonessential inputs, outputs, and tasks, and to derive the essentiality of inputs and outputs from the essentiality of tasks.

In embodiments, there is provided a method for independent processing of media segments which may have different durations or sizes in the cloud, which may involve extending the NBMP standard to support independent processing of segments with variable duration/dimensions.

In embodiments, there is provided an extension of the NBMP standard's step descriptor to define multi-dimensional segments.

In embodiments, there is provided a method for exclusion of some function instances from the descriptions that are applied to the entire workflow.

According to one or more embodiments, a method performed by at least one processor is provided. The method includes: deriving a network based media processing (NBMP) workflow; obtaining at least one first syntax element indicating that at least one task included in the NBMP workflow, at least one input received by the at least one task, or at least one output generated by the at least one task, is nonessential; determining a plurality of essential tasks based on the at least one first syntax element; and assigning the plurality of essential tasks to at least one from among a media sink, a media source, and a media processing entity included in the NBMP workflow.

According to one or more embodiments, a workflow manager of a media system is provided. The workflow manager includes: at least one processor; and memory including computer code. The computer code includes: workflow deriving code configured to cause the at least one processor to derive a network based media processing (NBMP) workflow; first obtaining code configured to cause the at least one processor to obtain at least one first syntax element indicating that at least one task included in the NBMP workflow, at least one input received by the at least one task, or at least one output generated by the at least one task, is nonessential; determining code configured to cause the at least one processor to determine a plurality of essential tasks based on the at least one first syntax element; and assigning code configured to cause the at least one processor to assign the plurality of essential tasks to at least one from among a media sink, a media source, and a media processing entity included in the NBMP workflow.

According to one or more embodiments, a non-transitory computer-readable medium storing computer code is provided. The computer code is configured to, when executed by at least one processor that implements a workflow manager of a media system, cause the at least one processor to: derive a network based media processing (NBMP) workflow; obtain at least one first syntax element indicating that at least one task included in the NBMP workflow, at least one input received by the at least one task, or at least one output generated by the at least one task, is nonessential; determine a plurality of essential tasks based on the at least one first syntax element; and assign the plurality of essential tasks to at least one from among a media sink, a media source, and a media processing entity included in the NBMP workflow.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
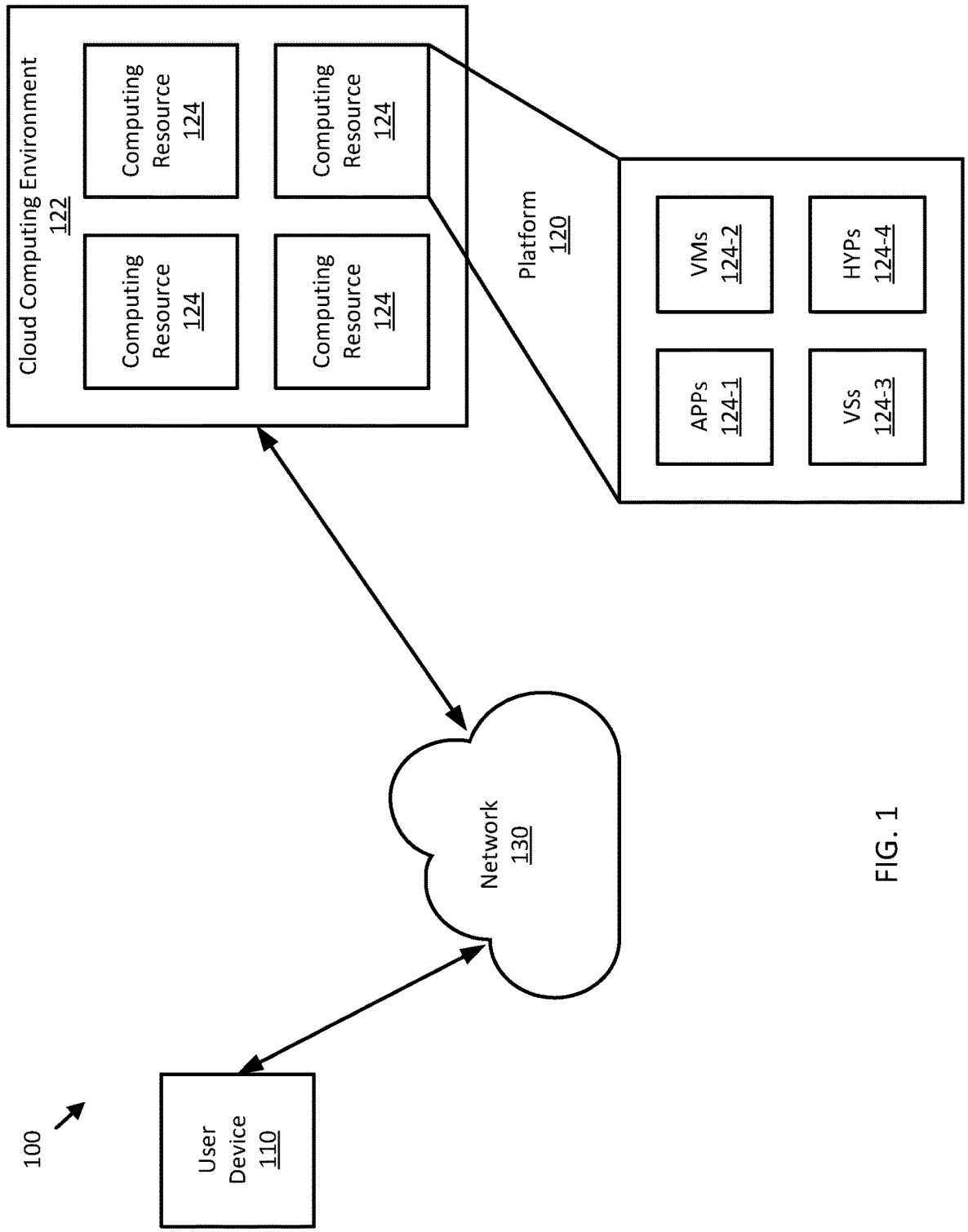
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g. a desktop computer, a laptop computer, a tablet computer, a handheld computer, a smart speaker, a server, etc.), a mobile phone (e.g. a smart phone, a radiotelephone, etc.), a wearable device (e.g. a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
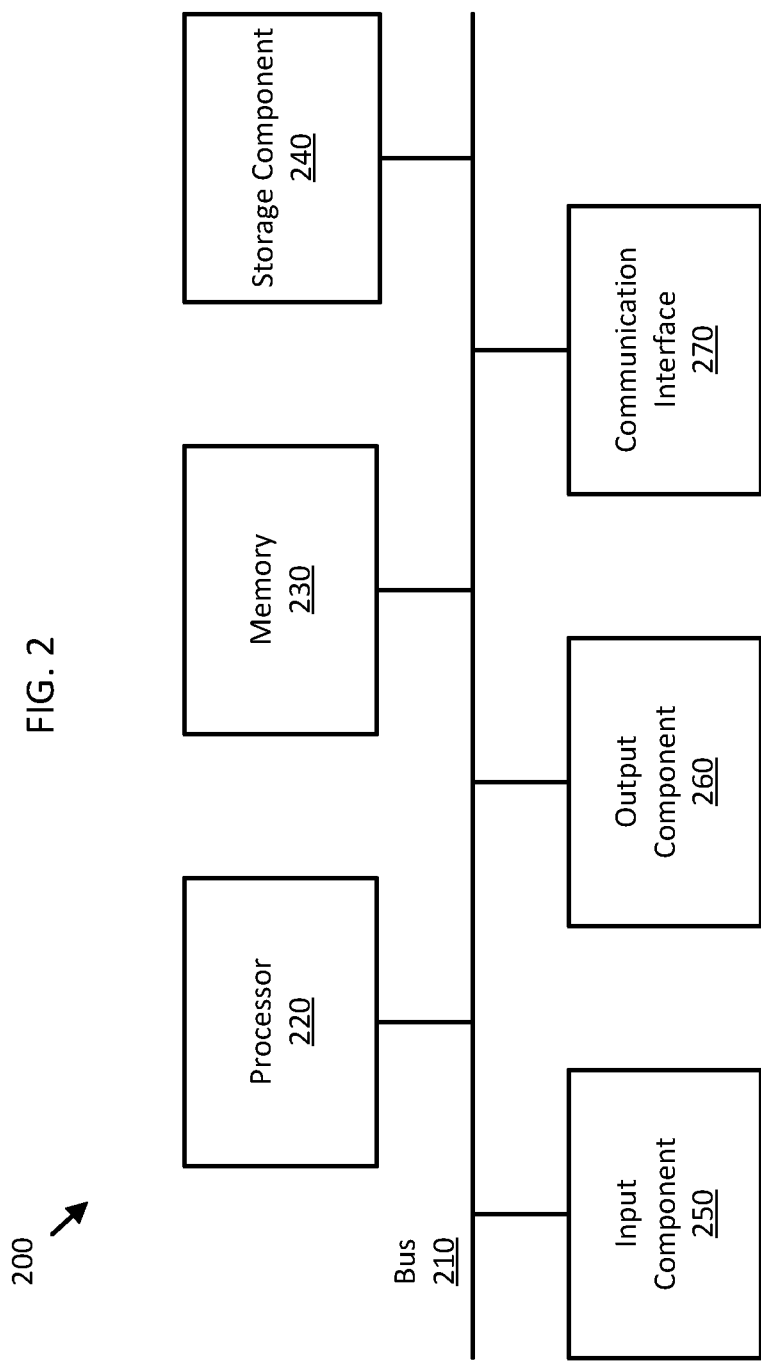
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g. a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
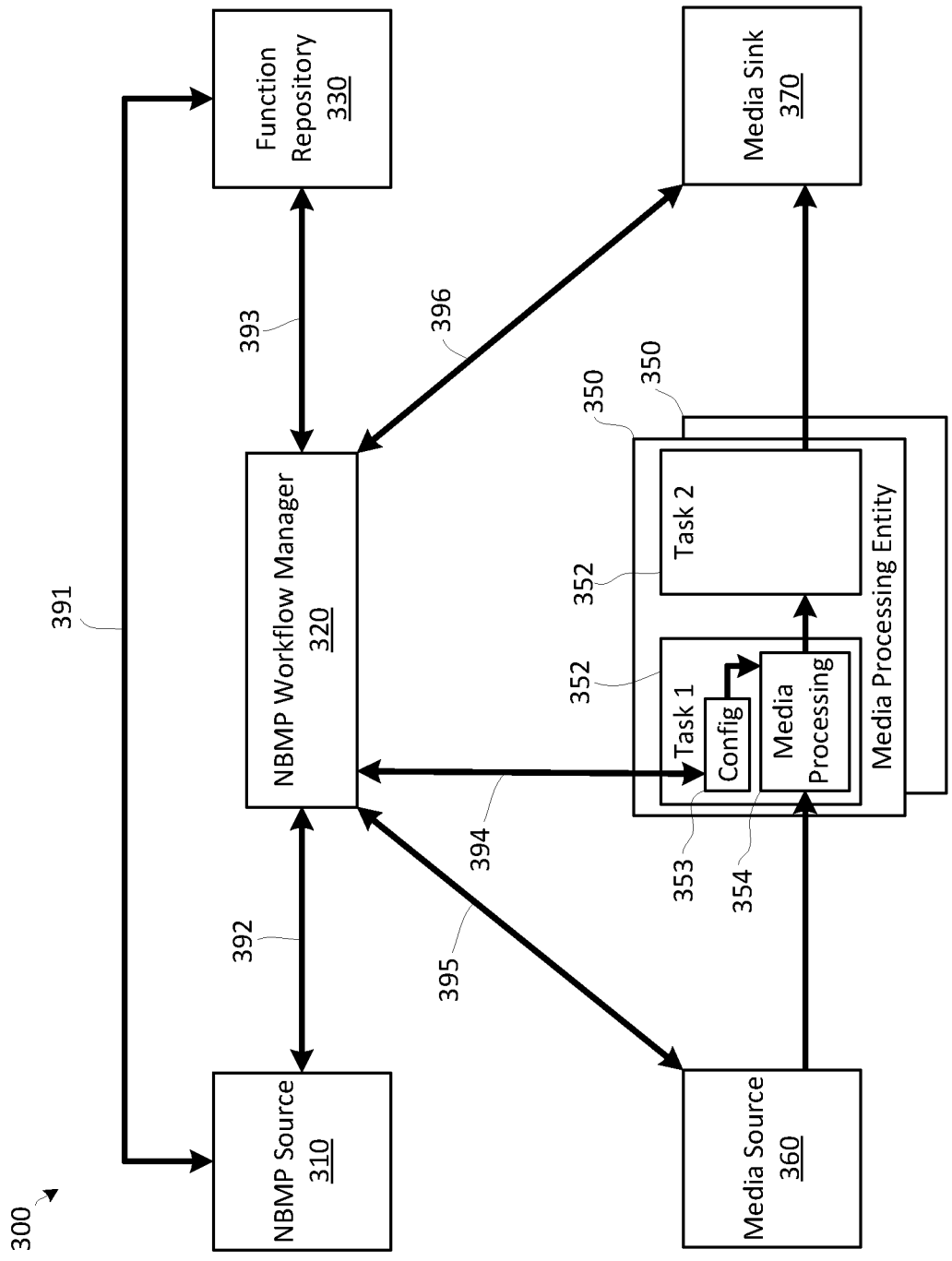
FIG. 3 is a block diagram of an NBMP system according to embodiments

In an embodiment of the present disclosure, an NBMP system 300 is provided. With reference to FIG. 3, the NBMP system 300 comprises an NBMP source 310, an NBMP workflow manager 320, a function repository 330, one or more media processing entities 350, a media source 360, and a media sink 370.

The NBMP source 310 may receive instructions from a third party entity, may communicate with the NBMP workflow manager 320 via an NBMP workflow API 392, and may communicate with the function repository 330 via a function discovery API 391. For example, the NBMP source 310 may send a workflow description document(s) (WDD) to the NBMP workflow manager 320, and may read the function description of functions stored in the function repository 330, the functions being media processing functions stored in memory of the function repository 330 such as, for example, functions of media decoding, feature point extraction, camera parameter extraction, projection method, seam information extraction, blending, post-processing, and encoding. The NBMP source 310 may comprise or be implemented by at least one processor and memory that stores code configured to cause the at least processor to perform the functions of the NBMP source 310.

The NBMP source 310 may request the NBMP workflow manager 320 to create workflow including tasks 352 to be performed by the one or more media processing entities 350 by sending the workflow description document, which may include several descriptors, each of which may have several parameters.

For example, the NBMP source 310 may select functions stored in the function repository 330 and send the workflow description document to the NBMP workflow manager 320 that includes a variety of descriptors for description details such as input and output data, required functions, and requirements for the workflow. The workflow description document may include a set of task descriptions and a connection map of inputs and outputs of tasks 352 to be performed by one or more of the media processing entities 350. When the NBMP workflow manager 320 receives such information from the NBMP source 310, the NBMP workflow manager 320 may create the workflow by instantiating the tasks based on function names and connecting the tasks in accordance with the connection map.

Alternatively or additionally, the NBMP source 310 may request the NBMP workflow manager 320 to create workflow by using a set of keywords. For example, NBMP source 310 may send the NBMP workflow manager 320 the workflow description document that may include a set of keywords that the NBMP workflow manager 320 may use to find appropriate functions stored in the function repository 330. When the NBMP workflow manager 320 receives such information from the NBMP source 310, the NBMP workflow manager 320 may create the workflow by searching for appropriate functions using the keywords that may be specified in a Processing Descriptor of the workflow description document, and use the other descriptors in the workflow description document to provision tasks and connect them to create the workflow.

The NBMP workflow manager 320 may communicate with the function repository 330 via a function discovery API 393, which may be a same or different API from the function discovery API 391, and may communicate with one or more of the media processing entities 350 via an API 394 (e.g. an NBMP task API). The NBMP workflow manager 320 may comprise or be implemented by at least one processor and memory that stores code configured to cause the at least processor to perform the functions of the NBMP workflow manager 320.

The NBMP workflow manager 320 may use the API 394 to setup, configure, manage, and monitor one or more tasks 352 of a workflow that is performable by the one or more media processing entities 350. In an embodiment, the NBMP workflow manager 320 may use the API 394 to update and destroy the tasks 352. In order to configure, manage, and monitor tasks 352 of the workflow, the NBMP workflow manager 320 may send messages, such as requests, to one or more of the media processing entities 350, wherein each message may have several descriptors, each of which have several parameters. The tasks 352 may each include media processing functions 354 and configurations 353 for the media processing functions 354.

In an embodiment, after receiving a workflow description document from the NBMP source 310 that does not include a list of the tasks (e.g. includes a list of keywords instead of a list of tasks), the NBMP workflow manager 320 may select the tasks based on the descriptions of the tasks in the workflow description document to search the function repository 330, via the function discovery API 393, to find the appropriate functions to run as tasks 352 for a current workflow. For example, the NBMP workflow manager 320 may select the tasks based on keywords provided in the workflow description document. After the appropriate functions are identified by using the keywords or the set of task descriptions that is provided by the NBMP source 310, the NBMP workflow manager 320 may configure the selected tasks in the workflow by using the API 394. For example, the NBMP workflow manager 320 may extract configuration data from information received from the NBMP source, and configure the tasks 352 based on the configuration data.

The one or more media processing entities 350 may be configured to receive media content from the media source 360, process the media content in accordance with the workflow, that includes tasks 352, created by the NBMP workflow manager 320, and output the processed media content to the media sink 370. The one or more media processing entities 350 may each comprise or be implemented by at least one processor and memory that stores code configured to cause the at least processor to perform the functions of the media processing entities 350.

The media source 360 may include memory that stores media and may be integrated with or separate from the NBMP source 310. In an embodiment, the NBMP workflow manager 320 may notify the NBMP source 310 when a workflow is prepared and the media source 360 may transmit media content to the one or more of the media processing entities 350 based on the notification that the workflow is prepared.

The media sink 370 may comprise or be implemented by at least one processor and at least one display that is configured to display the media that is processed by the one or more media processing entities 350.

As discussed above, messages from the NBMP Source 310 (e.g. a workflow description document for requesting creation of a workflow) to the NBMP workflow manager 320, and messages (e.g. for causing the workflow to be performed) from the NBMP workflow manager 320 to the one or more media processing entities 350 may include several descriptors, each of which may have several parameters. In cases, communication between any of the components of the NBMP system 300 using an API may include several descriptors, each of which may have several parameters.

[Nonessential Input, Output and Task Signaling in Workflows]

Embodiments may relate to a method to identify and signal the nonessential inputs, outputs and tasks in a workflow run on the cloud platforms.

An essential output of a workflow may be an output of that workflow that must produce data for the workflow to be considered as operating properly. An essential input of the workflow may be an input that must be processed for the workflow to create its essential outputs. A properly operating workflow may be a workflow that processes all of its essential inputs and produces all of its essential outputs. An essential task of a workflow may be a task necessary to operate properly and process data that is required for a properly operating workflow. For example, an essential task may be a task that processes an essential input, and/or produces an essential output. In embodiments, an essential input may be an input that is needed for an essential task to operate, and an essential output may be an output that is needed as an essential input for an essential task, or an output that is needed as an output for the workflow as a whole. A nonessential input may be an input that is not needed by the workflow in order to produce the essential outputs of the workflow. For example, a workflow may produce all of the essential outputs if all of the essential inputs are provided, even if none of the nonessential inputs are provided. A nonessential task may be a task that is included in the workflow, but that is not an essential task. For example, a nonessential task may process a nonessential input and produce a nonessential output.

Figure 4:
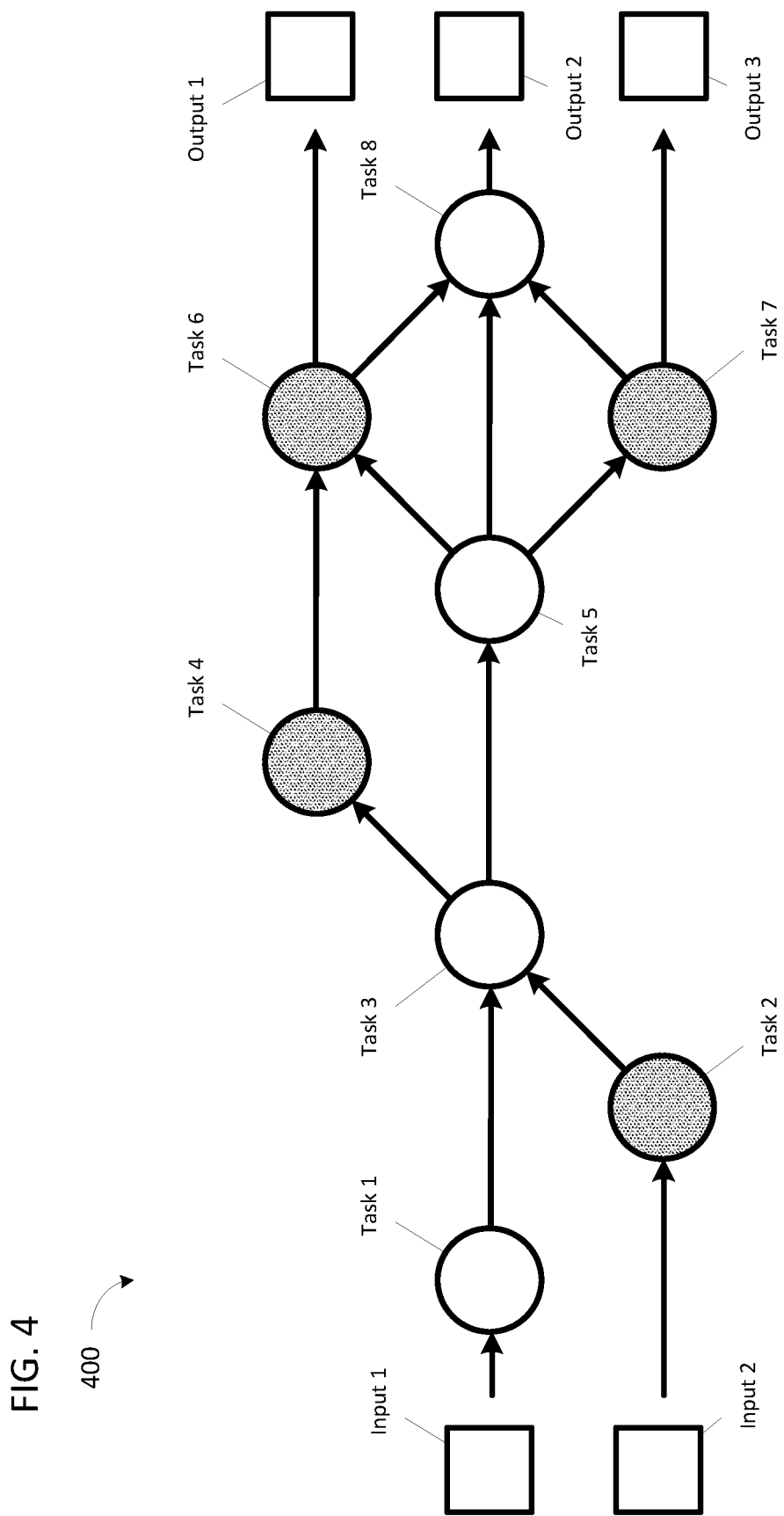
FIG. 4 is a diagram of an example of a workflow with essential and nonessential tasks, according to embodiments.

FIG. 4 shows an example of a workflow 400 with essential and nonessential tasks, according to embodiments.

In workflow 400, the nonessential tasks are shown with grey shaded circles. Therefore, as shown in FIG. 4, Task 1, Task 3, Task 5, and Task 8 are essential. Further, in the example shown in FIG. 5, Task 2, Task 4, Task 6, and Task 7 are nonessential.

Accordingly, in workflow 400, Input 1 can be categorized as an essential input, while Input 2 can be categorized as a nonessential input. Similarly, Output 2 can be categorized as an essential output, while Output 1 and Output 3 can be categorized as nonessential outputs.

[Signalling Essentiality in a Workflow]

In embodiments, a flag may be used to signal the essentiality of a task in a given workflow. By defining all essential and nonessential tasks of a workflow, the essential and nonessential inputs and outputs may also be defined or determined.

Table 1 shows an example in which a nonessentiality flag is added to a Task's general descriptor. In Table 1, and throughout the present disclosure, italics are used to show additions.

TABLE 1

Task's General Descriptor with added nonessentiality flag

| Parameter Name | Type | Cardinality |
| --- | --- | --- |
| id | P | 1 |
| name | P | 1 |
| description | P | 1 |
| rank | P | 0-1 |
| mpeg-compatibility | P | 0-1 |
| published-time | P | 0-1 |
| priority | P | 0-1 |
| execution-time | P | 0-1 |
| input-ports | Array of object | 1 |
| output-ports | Array of object | 1 |
| is-group | P | 0-1 |
| *nonessential* | *P* | *0-1* |
| state | P | 1 |

The added parameter is shown in italics. An example of a nonessential parameter is defined in Table 2.

TABLE 2

Nonessential parameter definition

| Name | Definition | Unit | Type | Valid range |
| --- | --- | --- | --- | --- |
| nonessential | value 'true' indicates the Task is not essential for Workflow to properly process the data, i.e. Workflow may run without this Task is being in idle or running state. The default value is 'false'. | N/A | boolean | N/A |

[Deriving the Essentiality and Nonessentiality of Input and Outputs of a Workflow]

If a workflow is defined by its graph of tasks, and if the tasks are identified as essential and nonessential, any input or output of a workflow can be identified to be essential or nonessential.

For a given workflow as a graph of essential and nonessential tasks, for any input and output pair, if the input can be connected to the output through at least one essential path, then both the input and output are essential. Any other input and output that can not satisfy the above condition are nonessential.

A path in a workflow may be a subset of that workflow that has only one input and one output, and the input may be connected to the output through a set of arrows connecting the tasks in the path, with the direction of each connection between two tasks being in the same direction of an arrow connecting input directly to the output. An essential path of a workflow may be a path in which all of the tasks included in the path are essential.

Figure 5:
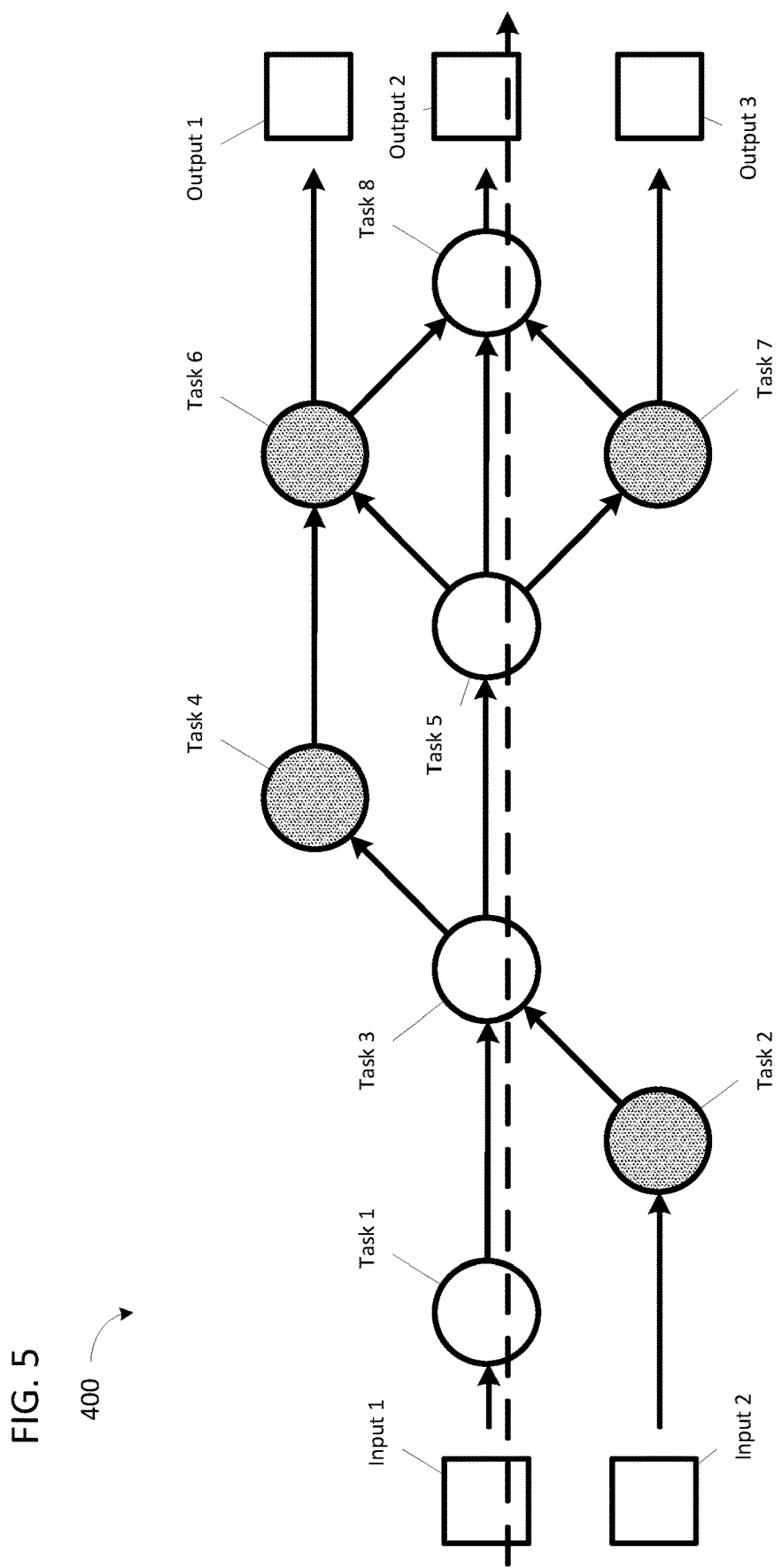
FIG. 5 illustrates an example of an essential path in a workflow, according to embodiments.

FIG. 5 illustrates one essential path in workflow 400 with a dashed arrow line.

[Signalling the Essentiality of Input and Outputs]

If a workflows graph is defined with the defined essentiality of its tasks, as shown above, the essentiality of the workflow's inputs and outputs can be derived.

However, in some cases, in a workflow description, only its inputs and outputs may be defined, while the exact workflow is left for a workflow manager to be derived. In this case, the workflow description may include or indicate the essentiality of its inputs and outputs.

In embodiments, a nonessentiality parameter may be defined for each output in the output descriptors, as shown in Table 3, Table 4, Table 5 and Table 6. For example, the nonessentiality parameter may indicate whether an input, output, task, or other object is essential or nonessential.

TABLE 3

Input media-parameters objects

| Name | Type | Cardinality |
| --- | --- | --- |
| stream-id | P | 1 |
| Name | P | 1 |
| Keywords | P | 1 |
| mime-type | P | 1 |
| video-format | P | 0-1 |
| audio-format | P | 0-1 |
| image-format | P | 0-1 |
| codec-type | P | 0-1 |
| Protocol | P | 1 |
| Throughput | P | 0-1 |
| Buffersize | P | 0-1 |
| caching-server-url | P | 1 |
| *nonessential* | *P* | *0-1* |

TABLE 4

Input metadata-parameters objects

| Name | Type | Cardinality |
| --- | --- | --- |
| stream-id | P | 1 |
| name | P | 1 |
| keywords | P | 1 |
| mime-type | P | 1 |
| codec-type | P | 0-1 |
| protocol | P | 1 |
| max-size | P | 0-1 |
| min-interval | P | 0-1 |
| caching-server-url | P | 0-1 |
| scheme-uri | P | 0-1 |
| *nonessential* | *P* | *0-1* |

TABLE 5

Output media-parameters objects

| Name | Type | Cardinality |
|---|---|---|
| stream-id | P | 1 |
| name | P | 1 |
| keywords | P | 1 |
| mime-type | P | 1 |
| video-format | P | 0-1 |
| audio-format | P | 0-1 |
| image-format | P | 0-1 |
| codec-type | P | 0-1 |
| protocol | P | 1 |
| throughput | P | 0-1 |
| buffersize | P | 0-1 |
| caching-server-url | P | 1 |
| *nonessential* | *P* | *0-1* |

TABLE 1

Output metadata parameters objects

| Name | Type | Cardinality |
|---|---|---|
| stream-id | P | 1 |
| name | P | 1 |
| keywords | P | 1 |
| mime-type | P | 1 |
| codec-type | P | 0-1 |
| protocol | P | 0-1 |
| max-size | P | 0-1 |
| min-interval | P | 0-1 |
| caching-server-url | P | 1 |
| scheme-uri | P | 0-1 |
| *nonessential* | *P* | *0-1* |

In embodiments, an output may be nonessential if both media and metadata parameters are nonessential.

[Deriving the Essentiality and Nonessentiality of Tasks from a Workflow's Inputs and Outputs]

If a workflow inputs and outputs essentialities are defined, the essentiality of the tasks (and its inputs) of the workflow can be derived.

For a given workflow as a graph of tasks and identified essential outputs, the following process can be used to identify the essential tasks:

First, for each nonessential input, if all other corresponding task's input are also nonessential, the task's outputs may be marked nonessential and the task may be removed. This process may be applied to all new nonessential inputs until no nonessential input is left for this process to be applied.

Second, for each nonessential output, if all other corresponding task's outputs are also nonessential, the task's inputs may be marked nonessential and the task may be removed. This process may be applied until no nonessential output is left for this process to be applied.

Figure 6:
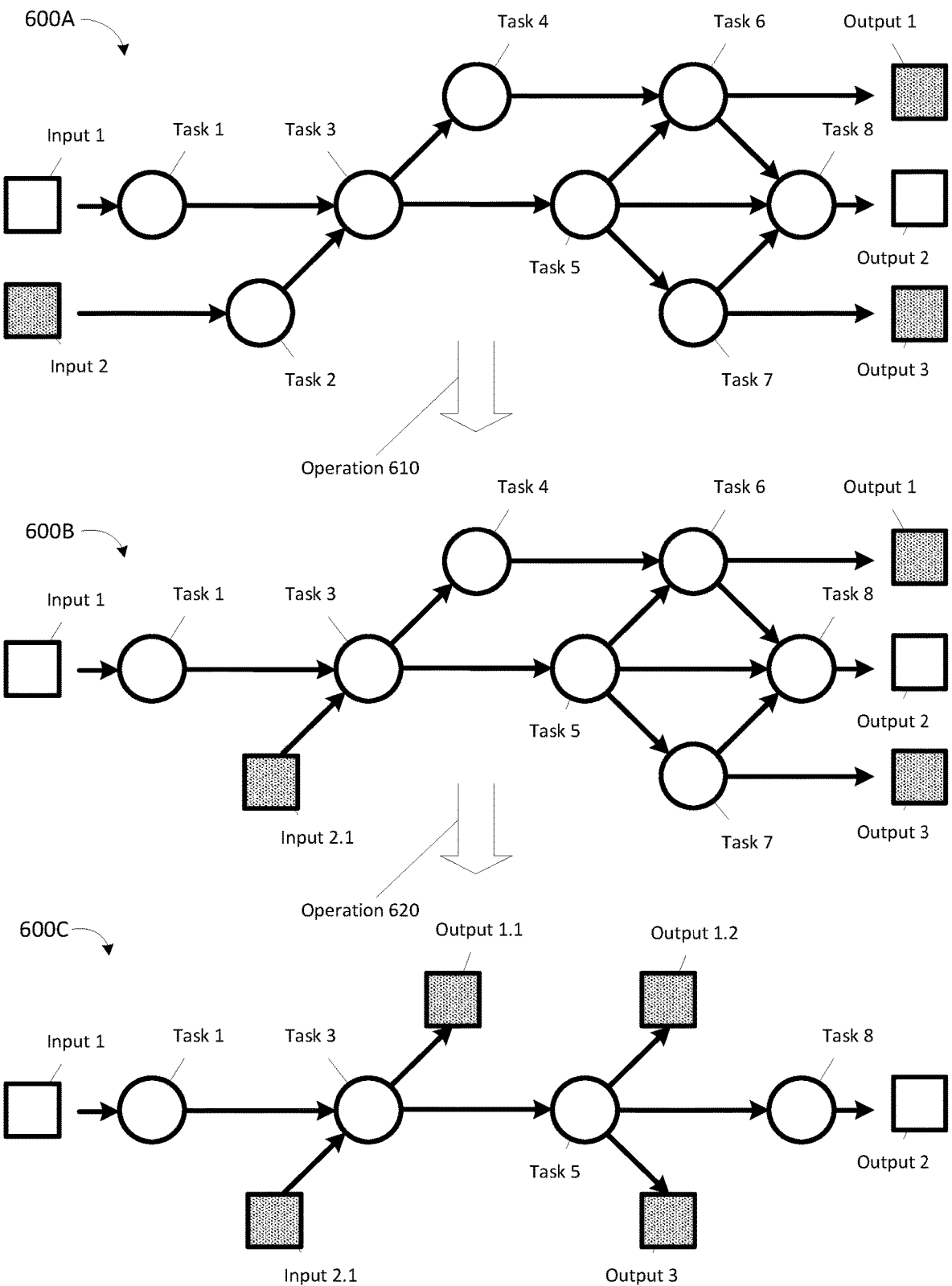
FIG. 6 is a diagram of a process for identifying essential tasks in a workflow, according to embodiments.

FIG. 6 shows an example of such process. For example, FIG. 6 shows a workflow 600A in which only the essentiality of the inputs are known. As can be seen in FIG. 6A, Input 1 is known to be essential, Input 2 is known to be nonessential, Output 2 is known to be essential, and Output 2 and Output 3 are known to be nonessential.

FIG. 6 also shows workflow 600B, which is a result of Operation 610 being performed on workflow 600A. Operation 610 may correspond to the first portion of the process described above. For example, because Input 2 is nonessential, and because Task 2 has no other inputs, then the output of Task 2 (shown as Input 2.1) is also be marked as nonessential, and Task 2 is removed.

FIG. 6 also shows workflow 600C, which is a result of Operation 620 being performed on workflow 600B. Operation 620 may correspond to the second portion of the process described above. For example, because Output 1 is nonessential, and because Task 6 has no other outputs, then the input of Task 6 (shown as Output 1.2) is marked as nonessential, and Task 6 is removed. Similarly, because Task 4 has no essential outputs, then the input of Task 6 (shown as Output 1.1) is also marked as nonessential, and Task 6 is removed. Further, because Output 3 is nonessential, and because Task 7 has no other outputs, then the input of Task 7 (shown as Output 3) is also marked as nonessential, and Task 7 is removed.

Therefore, as a result of operation 610 and 620, Task 2, Task 4, Task 6 and Task 7 are removed and therefore these tasks may be determined as nonessential tasks. Similarly, because Task 1, Task 3, Task 5 and Task 8 remain, these tasks may be determined as essential tasks.

Embodiments may relate to a method for defining essentiality of inputs, outputs, and tasks in a workflow, wherein an input, output, or task can be defined nonessential for the rest of workflow and if that entity is removed, the workflow is still properly operational.

Embodiments may relate to a method for signaling the essentiality of tasks, wherein a flag is used for signaling the nonessentiality of the task in its description.

Embodiments may relate to a method for signalling the essentiality of one input or one output, wherein a flag is used for signalling the nonessentiality of the input or the output in its description.

Embodiments may relate to a method of deriving the essentiality of inputs and outputs of a workflow when the essentiality of the workflow's tasks are identified wherein the essential paths of the workflow and the corresponding essential input-output pairs are identified.

Embodiments may relate to a method of deriving the essentiality of tasks of a workflow when the essentiality of the workflow's inputs and/or outputs are identified wherein using this method the workflow graph is simplified until all nonessential tasks are identified.

[Independent Processing of Media Segments with Variable Durations on Cloud]

Embodiments may relate to a method for independent processing of media segments which may have different durations or sizes in the cloud.

Figure 7:
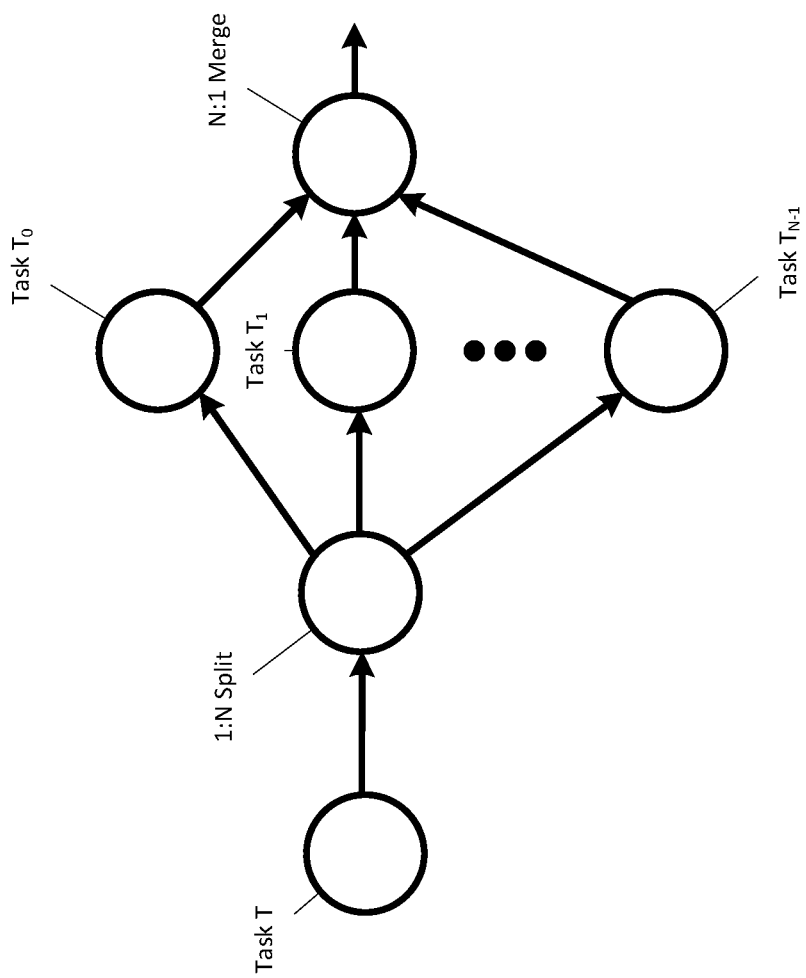
FIG. 7 is a diagram of a process for independent processing of media segments which may have different durations or sizes, according to embodiments.

FIG. 7 shows an example of a process 700 of using split/merge for parallel processing of the segments. In FIG. 7, Task T is converted to n instances of Task T (i.e., Task $T_0$, Task $T_1$, . . . , Task $T_{N-1}$), running in parallel.

In FIG. 7, the media stream is continuous. However, 1:N Split function converts the media stream to N media sub-streams. Each sub-stream is processed by an instance of T and then the sub-streams are interleaved together to generate the output, equivalent of Task T output stream.

1:N Split and N:1 Merge functions work on the segment boundaries. Each segment has a duration of equal to one or multiple T's Task Segment Duration (TSD), and therefore, the segments and consequently the sub-streams are independent of each other in terms of being processed by Task T. Note that Task $T_0$, . . . , $T_{N-1}$, do not need to process the segments at the same time. Since the segments and sub-streams are independent, each instance of Task can run at its speed.

Since each segment in each substream carries its start time, duration, and length, they can be multiplexed together in the right order.

The NBMP amendment defines the splitter and merger function template for the above operations.

The NBMP standard includes a Step Descriptor that describes processing mode and temporal segment duration for each function as shown in Table 7.

TABLE 7

NBMP Step Descriptor

| Name | Definition | Unit | Type | Valid range |
|---|---|---|---|---|
| step-mode | running mode with the following values:<br>'stream': continuous execution<br>'stateful': maintain the state of tasks at end each step<br>'stateless': run in stateless mode without the need for maintaining state<br>The default value is 'stream'. | N/A | string | N/A |
| segment-duration | duration for which the output(s) of resource are independent to any inputs outside of the corresponding duration. | micro-seconds | number | unsigned integer |
| operation-units | number of segment-duration the resource is operating in a stateless fashion | N/A | number | unsigned integer |

As is shown in Table 7, the segment duration is the same for all segments.

[Extending the Step Descriptor]

In practice, the segment durations may vary segment to segment. Therefore, instead of the segment duration as the parameter of operation, embodiments may include a segment marker for the separation of the segment. In this case, it is useful to have a maximum segment duration. Embodiments may also signal whether a variable segment duration is allowed or not.

TABLE 8

Step Descriptor with a variable segment duration

| Name | Definition | Unit | Type | Valid range |
|---|---|---|---|---|
| step-mode | running mode with the following values:<br>'stream': continuous execution<br>'stateful': maintain the state of tasks at end each step<br>'stateless': run in stateless mode without the need for maintaining state<br>The default value is 'stream'. | N/A | string | N/A |
| segment-duration | duration for which the output(s) of resource are independent to any inputs outside of the corresponding duration. This value indicates the maximum segment-duration if the variable-duration is 'True'. | micro-seconds | number | unsigned integer |
| variable-duration | If set to 'True', the duration of segments may vary.<br>The default is 'False'. | N/A | N/A | binary |

[Extending the Splitter and Merger Reference Function Templates]

To convert a media stream with variable segment durations to multiple streams using the splitter function and then combined them after processing using the merger function, embodiments may extend the NBMP Splitter and Merger reference function templates in the following.

[Splitter]
[NBMP Brand Name]
   urn:mpeg:mpegi:nbmp:2020:split

DESCRIPTION

These requirements assume that the input media stream is continuous without any gaps. In this clause, [a,b[ means a time range equal or greater than a and smaller than b.

The Splitter Function may have the following requirements:
  one input and N output FIFO buffers, where N is a configuration parameter for the number of splits.

Operates one input segment at each time and generates N output segments

Each input segments shall satisfy the following requirements:
  continuous set of samples
  maximum duration of N*D in scale of time-scale T, where D and T are configuration parameters
  include the following metadata and constraint:
    Start time s (msec)
    time-scale t
    maximum duration N*d, where d=D*T/t is an integer number i.e. D*T is divisible by t
    length l (bytes)
    segment marker when variable-duration='True', where segment markers indicated the starting time of each segment
  Non-overlapping samples with other input segments
The set of input segments shall cover the entire duration of input, i.e. no samples of input is left out from the total duration
Operates on input segments in incrementing order, i.e a segment covering the earlier duration of the time shall be processed before any segment covering later duration.
The media streams at every output buffer at any time consist of zero or more output segments. Each output segment shall satisfy the following requirements
  continuous duration of samples maximum duration of d in scale of time-scale t include the following metadata:
  Start time s (msec)
  Time-scale t
  maximum duration d in scale of time-scale t
  length l (bytes)
The collection of all output segments of all output buffer together shall cover the entire duration of input, i.e. no sample of input is left out of the collection of output segments.
Splitter shall operate on every one input segment and divide it into N output segments in the following manner:
  Every output buffer receives one output segment.
  Each input segment is divided into the N output segment with the following order of $s_0, s_1, \ldots, s_{N-1}$, where the segment $s_i$ covers the duration of media right after segment $s_{i-1}$ and $s_{i+1}$.
  The output buffers are ordered as $O_0, O_1, \ldots, O_{N-1}$.
  The output segment $s_i$ in placed in buffer $O_i$.

[Function Description Template]

TABLE 9

Splitter Function Description Template

| Descriptor | Parameter Name | Type | Description |
|---|---|---|---|
| General | nbmp-brand | String | "urn:mpeg:mpegi:nbmp:2020:split" |
| | input-ports | Object | input streams according to configuration |
| | output-ports | Object | output streams according to configuration |
| Processing | Keywords | Array | [ "1 to n split", "stateless", "parallelism" ] |
| Configuration | Parameters | Array | Function parameters: number of splits time-scale segment-duration variable-duration input-buffer size output-buffer sizes maximum segment size non-segment-operation percentage increment fullness event |
| Variables | percent-full-buffer | Array of object | Parameter: buffer-fullness |
| Events | percent-full-buffer | Array of object | Parameter: buffer-fullness |

[Configuration Parameters]
[Parameters]

TABLE 10

Splitter configuration parameters

| Name | Definition | Unit | Type | Valid range |
|---|---|---|---|---|
| split-number | Number of splits | N/A | number | unsigned integer (non-zero) |
| time-scale | The timescale in units per second to be used for the derivation of different real-time duration values of media segments. If not present on any level, it shall be set to 1. | N/A | number | unsigned integer |
| segment-duration | The duration of the operational segment in scale of time-scale If variable-duration is 'True', this value indicates the maximum duration of the segment. | N/A | number | unsigned integer |
| variable-duration | If 'True', the segment duration may vary segment to segment. If 'False', every segment has a duration equal to segment-duration. | N/A | N/A | boolean |
| in-buffer-size | Size of the input FIFO buffer | byte | number | unsigned integer |
| out-buffer-size | Size of each output FIFO buffer | byte | number | unsigned integer |
| max-segment-size | Maximum size of operational segment | byte | number | unsigned integer |
| non-segment-op | If 'true', this implementation supports non-segment operation. The default is 'false'. | N/A | Boolean | Boolean |
| buffer-fullness-inc-event | The percentage increase of buffer fullness by which an event is issued | N/A | number | unsigned integer between 1 and 100 | unsigned integer = [0, (2*53) − 1]

TABLE 11

MIFIFO variable parameter

| Name | Definition | Unit | Type | Valid range |
|---|---|---|---|---|
| buffer-fullness | The level buffer fullness | percentage | number | unsigned integer | unsigned integer = [0, (2*53) − 1]

[JSON Schema]
[Configuration]

TABLE 12

```
{
  "parameters": [
    {
      "name": "split-number",
      "id": 1,
      "datatype": "integer",
      "values": [
        {
          "name": "nonzero",
          "id": 11,
          "restrictions": { "min-value": 1 }
        }
      ]
    },
    {
      "name": "time-scale",
      "id": 2,
      "datatype": "integer",
      "values": [
        {
          "name": "nonzero",
          "id": 21,
          "restrictions": { "min-value": 1 }
        }
      ]
    },
    {
      "name": "segment-duration",
      "id": 3,
      "datatype": "integer",
```

TABLE 12-continued

```
    "values": [
      {
        "name": "nonzero",
        "id": 31,
        "restrictions": { "min-value": 1 }
      }
    ]
  },
  {
    "name": "variable-duration",
    "id": 4,
    "datatype": "boolean",
  },
  {
    "name": "in-buffer-size",
    "id": 5,
    "datatype": "integer",
    "values": [
      {
        "name": "nonzero",
        "id": 51,
        "restrictions": { "min-value": 1 }
      }
    ]
  },
  {
    "name": "out-buffer-size",
    "id": 6,
    "datatype": "integer",
    "values": [
      {
        "name": "nonzero",
        "id": 61,
        "restrictions": { "min-value": 1 }
      }
    ]
  },
  {
    "name": "max-segment-size",
    "id": 7,
    "datatype": "integer",
    "values": [
      {
        "name": "nonzero",
        "id": 71,
        "restrictions": { "min-value": 1 }
      }
    ]
  },
  {
    "name": "non-segment-op",
    "id": 8,
    "datatype": "boolean"
  },
  {
    "name": "buffer-fullness-inc-event",
    "id": 9,
    "datatype": "integer",
    "values": [
      {
        "name": "nonzero",
        "id": 91,
        "restrictions": {
          "min-value": 1,
          "max-value": 100
        }
      }
    ]
  }
]
}
```

[Variable]

TABLE 13

```
{
  "name": "buffer-fullness",
  "definition": "level of buffer fullness in percentage",
```

TABLE 13-continued

```
  "unit": "percentage",
  "var-type": "integer",
  "min": 0,
  "max": 100
}
```

[Event JSON]

TABLE 14

```
{
  "name": "buffer-fullness",
  "definition": "level of buffer fullness in percentage",
}
```

[Merger]
[NBMP Brand Name]
urn:mpeg:mpegi:nbmp:2020:merge
[Description]
The requirements assume that the input media stream is continuous without any gaps. In this clause, [a,b[ means a time range equal or greater than a and smaller than b.

The Merger Function shall have the following requirements:

N input and one output FIFO buffers, where N is a configuration parameter for the number of splits.

Operates one input segment from each input buffer, total N segments, at each time and generates one output segment Each input segments shall satisfy the following requirements:
 continuous set of samples
 maximum duration of D in the scale of time-scale T, where D and T are a configuration parameters
 include the following metadata:
  Start time s (msec)
  time-scale t
  maximum duration d in the scale of t, where $d=D*T/t$ is an integer number i.e. $D*T$ is divisible by t.
  length l (bytes)
 Non-overlapping samples with other input segments The set of input segments of N buffer shall cover the entire duration of input, i.e. no sample of input is left out from the total duration.

Operates on the input segments in incrementing order, i.e a segment covering an earlier duration of the time shall be processed before any segment covering later duration.

The media streams at the output buffer at any time consist of zero or more output segments. Each output segment shall satisfy the following requirements
 continuous duration of samples
 duration of $N*d$ in the scale of t
 include the following metadata:
  Start time s (msec)
  time-scale of t
  duration $N*d$
  length l (bytes)
  segment marker when variable-duration='True', where segment markers indicated the starting time of each segment The collection of output segments of all output buffer together shall cover the entire duration of input, i.e. no sample of input is left out of the collection of output segments.

Splitter shall operate on every one input segment from each input buffer and merge them into one output segment in the following manner:

One segment from each input buffer is processed, $s_0$, $s_1, \ldots, s_{N-1}$, from input buffers $I_0, I_1, \ldots, I_{N-1}$, respectively. The segment $s_i$ includes samples of time interval exactly between the time intervals of $s_{i-1}$ and $s_{i+1}$.

Segment $s_0, s_1, \ldots, s_{N-1}$ are concatenated in shown order into one output segment, such that the output segment includes all samples of segment $s_0$, $s_1, \ldots, s_{N-1}$ and with no repeating samples, and with the earliest presentation of EPT.

[Function Description Template]

TABLE 15

Merger Function Description Template

| Descriptor | Parameter Name | Type | Description |
|---|---|---|---|
| General | nbmp-brand | String | "urn:mpeg:mpegi:nbmp:2020:merge" |
| | input-ports | Object | input streams according to configuration |
| | output-ports | Object | output streams according to configuration |

TABLE 15-continued

Merger Function Description Template

| Descriptor | Parameter Name | Type | Description |
|---|---|---|---|
| Processing | Keywords | Array | [ "n to 1 merge", "stateless", "parallelism" ] |
| Configuration | Parameters | Array | Function parameters: segment-duration variable-duration number of merges input buffer sizes output buffer sizes maximum segment size non-segment-operation percentage increment fullness event |
| Variables | percent-full-buffer | Array of object | Parameter: buffer-fullness |
| Events | percent-full-buffer | Array of object | Parameter: buffer-fullness |

[Configuration Parameters]
[Parameters]

TABLE 16

Merge configuration parameters

| Name | Definition | Unit | Type | Valid range |
|---|---|---|---|---|
| merge-number | Number of merges | N/A | number | unsigned integer (non-zero) |
| time-scale | The timescale in units per second to be used for the derivation of different real-time duration values of media segments. If not present on any level, it shall be set to 1. | N/A | number | unsigned integer |
| segment-duration | The duration of the operational segment in scale of time-scale. If variable-duration is 'True', this value indicates the maximum duration of the segment. | N/A | number | unsigned integer |
| variable-duration | If 'True', the segment duration may vary segment to segment. If 'False', every segment has a duration equal to segment-duration. | N/A | N/A | boolean |
| in-buffer-size | Size of each input FIFO buffers. | byte | number | unsigned integer |
| out-buffer-size | Size of the output FIFO buffer. | byte | number | unsigned integer |
| max-segment-size | Maximum size of operational segment | byte | number | unsigned integer |
| non-segment-op | If 'true', this implementation supports non-segment operation The default is 'false'. | N/A | boolean | Boolean |
| buffer-fullness-inc-event | The percentage increase of buffer fullness by which an event is issued | N/A | number | unsigned integer between 1 and 100 | unsigned integer = $[0, (2^{*}53) - 1]$

TABLE 17

Merger variable parameter

| Name | Definition | Unit | Type | Valid range |
|---|---|---|---|---|
| buffer-fullness | The level buffer fullness unsigned integer = [0, (2*53) − 1] | percentage | number | unsigned integer |

[JSON Schema]
[Configuration]

TABLE 18

```
{
    "parameters": [
        {
            "name": "merge-number",
            "id": 1,
            "datatype": "integer",
            "values": [
                {
                    "name": "nonzero",
                    "id": 11,
                    "restrictions": { "min-value": 1 }
                }
            ]
        },
        {
            "name": "time-scale",
            "id": 2,
            "datatype": "integer",
            "values": [
                {
                    "name": "nonzero",
                    "id": 21,
                    "restrictions": { "min-value": 1 }
                }
            ]
        },
        {
            "name": "segment-duration",
            "id": 3,
            "datatype": "integer",
            "values": [
                {
                    "name": "nonzero",
                    "id": 31,
                    "restrictions": { "min-value": 1 }
                }
            ]
        },
        {
            "name": "variable-duration",
            "id": 4,
            "datatype": "boolean",
        },
        {
            "name": "in-buffer-size",
            "id": 5,
            "datatype": "integer",
            "values": [
                {
                    "name": "nonzero",
                    "id": 51,
                    "restrictions": { "min-value": 1 }
                }
            ]
        },
        {
            "name": "out-buffer-size",
            "id": 6,
            "datatype": "integer",
            "values": [
                {
                    "name": "nonzero",
                    "id": 61,
                    "restrictions": { "min-value": 1 }
                }
```

TABLE 18-continued

```
            ]
        },
        {
            "name": "max-segment-size",
            "id": 7,
            "datatype": "integer",
            "values": [
                {
                    "name": "nonzero",
                    "id": 71,
                    "restrictions": { "min-value": 1 }
                }
            ]
        },
        {
            "name": "non-segment-op",
            "id": 8,
            "datatype": "boolean"
        },
        {
            "name": "buffer-fullness-inc-event",
            "id": 9,
            "datatype": "integer",
            "values": [
                {
                    "name": "nonzero",
                    "id": 91,
                    "restrictions": {
                        "min-value": 1,
                        "max-value": 100
                    }
                }
            ]
        }
    ]
}
```

[Variable]

TABLE 19

```
{
    "name": "buffer-fullness",
    "definition": "level of buffer fullness in percentage",
    "unit": "percentage",
    "var-type": "integer",
    "min": 0,
    "max": 100
}
```

[Event JSON]

TABLE 20

```
{
    "name": "buffer-fullness",
    "definition": "level of buffer fullness in percentage",
}
```

Embodiments may relate to a method for describing a segmentation of the media with variable duration segments wherein the media is processed by independent segments with variable durations, wherein the step descriptor is extended to signal the function's support for variable segment duration.

Embodiments may relate to a method for splitting and merging media streams to and from multiple media sub-streams wherein the split and merge function is performed on segments with variable durations wherein the boundaries of segments are defined and the process of split and merge are performed at these boundaries.

[Processing Multidimensional Media Segments on Cloud]

Embodiments may relate to a multi-dimensional media segment method for processing the media segments independently in the cloud. Embodiments may extend the NBMP standard's step descriptor to define multi-dimensional segments.

The NBMP standard includes a Step Descriptor that describes processing mode and temporal segment duration for each function as shown in Table 21.

TABLE 21

NBMP Step Descriptor

| Name | Definition | Unit | Type | Valid range |
|---|---|---|---|---|
| step-mode | running mode with the following values: 'stream': continuous execution 'stateful': maintain the state of tasks at end each step 'stateless': run in stateless mode without the need for maintaining state The default value is 'stream'. | N/A | string | N/A |
| segment-duration | duration for which the output(s) of resource are independent to any inputs outside of the corresponding duration. | microseconds | number | unsigned integer |
| operation-units | number of segment-duration the resource is operating in a stateless fashion | N/A | number | unsigned integer |

[General Concept]

Embodiments may extend the segment dimension to other dimensions that temporal axis. Table 22 shows an example of this extension.

TABLE 22 multidimensional Step Descriptor

| Name | Definition | Unit | Type | Valid range |
|---|---|---|---|---|
| step-mode | running mode with the following values: 'stream': continuous execution 'stateful': maintain the state of tasks at end each step 'stateless': run in stateless mode without the need for maintaining state The default value is 'stream'. | N/A | string | N/A |
| segment-duration | duration for which the output(s) of resource are independent to any inputs outside of the corresponding duration. | microseconds | number | unsigned integer |
| operation-units | number of segment-duration the resource is operating in a stateless fashion | N/A | number | unsigned integer |
| temporal-overlap | determines the size of overlap between segments. The default value is 0. | N/A | array | Unsigned integer |
| higher-dimensions-size | The number of dimensions of segment other than temporal. The default value is 2. | N/A | number | unsigned integer larger than 0 |
| higher-dimensions-descriptions | The description of each other dimension. The array size is equal to 'other-dimensions-size'. Each element is a string. The following values are defined: 'width': width of media frame 'height': height of media frame 'RGB': color components R, G and B 'depth': non-depth and depth 'YUV': color components Y, U, V 'V-PCC': V-PCC components patch, geometry, occupancy and attribute | N/A | N/A | Array of strings |
| higher-segment-size | An array defining the size of segment in the higher dimensions. The array size is equal to 'other-dimensions-size'. Each element is unsigned non-zero integer. The unit of size in each dimension depends on the unit of media on that dimension. For instance, the unit of dimension for spatial dimensions is pixel, and for color components is color component index. | N/A | array | Array of unsigned nonzero integers |

TABLE 22-continued multidimensional Step Descriptor

| Name | Definition | Unit | Type | Valid range |
|---|---|---|---|---|
| higher-overlap | determines the size of overlap at each dimension other than temporal. The array size is equal to 'other-dimension-size'. Each element is unsigned integer. The default value is an array of 0s. | N/A | array | Array of unsigned integers |
| higher-operation-units | number of segments size of the resource in each dimension is operating in a stateless fashion. The array size is equal to 'other-dimension-size'. Each element is unsigned nonzero integer. The default value is an array of is. | N/A | number | Array of unsigned nonzero integers |

Example 1: For example, dividing a video frame into tiles for step processing can be achieved by the following configuration:
higher-dimensions-size=2
higher-dimensions-description=[width, height]
higher-segment-size=[w, h] where w and h represent the width and height of each independent tile.

Example 2: For a video with 3 color components:
Higher-dimensions-size=1
higher-dimensions-descriptions=[RGB]
higher-segment-size=[c] where c represents the color component video.

The parameter overlap-size indicates the amount of overlap in each dimension. For instance, an overlap-size of [16 16] in Example 1 indicates an overlap of 16 samples in the width and height of the neighboring tiles.

[JSON Implementation]

The JSON implementation of the above concept is shown in Table 23.

TABLE 23

```
{
    "title": "Step Descriptor Schema",
    "type": "object",
    "minProperties": 1,
    "properties": {
        "direct": {
            "type": "string",
            "enum":["stream", "stateful", "stateless"],
            "default": "stream"
        },
        "segment-duration": {
            "type": "integer",
            "minimum": 0
        },
        "operating-units": {
            "type": "integer",
            "minimum": 0
        },
        "temporal-overlap": {
            "type": "integer",
            "minimum": 0
        },
        "higher-dimensions-size": {
            "type": "integer",
            "minimum": 1
        },
        "if": {
            "required": ["higher-dimensions-size"]
        },
        "then": {
            "higher-dimension-description": {
                "type": "array",
```

TABLE 23-continued

```
                "minItems": 1,
                "items": {"type": "string"}
            },
            "higher-segment-size": {
                "type": "array",
                "minItems": 1,
                "items": {"type": "string"}
            },
            "higher-overlap": {
                "type": "array",
                "minItems": 1,
                "items": {"type": "string"}
            },
            "higher-operation-units": {
                "type": "array",
                "minItems": 1,
                "items": {"type": "string"}
            }
        }
    }
}
```

Embodiments may relate to a method for describing a segmentation of multidimensional media signal to multidimensional segment by which each segment may be processed independently, wherein the dimension of the media segments and its properties, including size in each dimension and the amount of overlap in each dimension as well as the number of processing segments are described in a descriptor, wherein the descriptor can be used in a function description to describe the properties of the function or in a workflow or task description to describe the processing operation of the function in an operating workflow, by which allows independent or parallel processing of these multidimensional segments.

[Excluding Functions Instances and Tasks from Workflow Descriptors Configurations and Policies]

Embodiments may relate to a method for excluding function instances and tasks from one or more descriptors defined in a workflow description.

The NBMP amendment 1 includes the following method for the exclusion of functions:

[Scope Descriptor]

The descriptor shall be included as a parameter scope to those descriptors defined in a WDD to indicate those tasks from which those descriptor parameters should be ignored as is shown in Table 24.

TABLE 24

Scope Descriptor

| Parameter | Type | Cardinality |
|---|---|---|
| blacklist | Array of string | 0.1 |

TABLE 25

JSON Schema

```
"scope": {
  "title": "Scope Descriptor Schema",
  "type": "object",
  "required": ["blacklist"],
  "properties": {
    "blacklist": {
      "type": "array",
      "minItems": 1,
      "uniqueItems": true,
      "items": {
        "type": "string"
      }
    }
  }
}
```

[Scope Descriptor Parameters]

Table 26 defines the parameters used in Scope Descriptor.

TABLE 26

Scope parameters

| Name | Definition | Unit | Type | Valid range |
|---|---|---|---|---|
| blacklist | The list of function names for which Workflow Manager shall ignore those parameters defined in WDD | N/A | Array of string | N/A |

The above implementation presents a number of problems. For example, the scope descriptor is used to exclude specific descriptors in WDD for a subset of Functions. It is used inside a Descriptor and is not a standalone descriptor. It applies to certain descriptors and not all. The possible descriptors to be used with are the security, requirements, reporting, and notification. It is not clear the function list is the names or identifier of the functions.

Accordingly, no clear list of descriptors is defined yet that the blackout list may be applied. It is not clear that the blackout is applied to a function, function instance/task in a workflow. A Workflow Description Document (WDD) may or may not include a workflow. If the WDD includes the workflow, it has a connection-map and possibly function-restrictions arrays of objects. If the WDD doesn't include the workflow, the descriptors are applied to the WDD and the functions and tasks are not defined yet. A Workflow Manager may choose different functions from one or more repositories to realize the workflow. The blackout list is a binary flag, meaning if a function is listed in the blackout list of the descriptor, the descriptor is not applied to a task implementing that function.

Because the function-restrictions list the restriction of each function in the workflow, embodiments may relate to adding the blacklist to that element.

For example, the following changes may be made:
Function Restrictions
a) Other descriptors may be added that are missing from the above table regardless of the blacklist feature.
b) A blacklist may be added array to list the descriptors that are excluded for a function instance.

TABLE 27 function-restrictions array element

| Name | Description | Type | Cardinality |
|---|---|---|---|
| instance | Instance identifier | P | 1 |
| general | General Descriptor restriction of this instance. | O | 0-1 |
| processing | General Descriptor restriction of this instance. | O | 0-1 |
| requirement | Requirement Descriptor restriction of this instance. | O | 0-1 |
| configuration | Configuration Descriptor restriction of this instance. | O | 0-1 |
| client-assistance | Client-Assistance Descriptor restriction of this instance. | O | 0-1 |
| failover | Fail-over Descriptor restriction of this instance | O | 0-1 |
| monitoring | Monitoring Descriptor restriction of this instance. | O | 0-1 |
| reporting | Reporting Descriptor restriction of this instance. | O | 0-1 |
| notification | Notification Descriptor restriction of this instance. | O | 0-1 |
| security | Security Descriptor restriction of this instance. | O | 0-1 |
| blacklist | The list of excluded WDD descriptors for this function instance | Array | 0-1 |

An example JSON implementation is shown in Table 28.

TABLE 28

```
"function-restrictions": {
  "type": "array",
  "uniqueItems": true,
  "items": [
    {
      "type": "object",
      "required": [
        "instance"
      ],
      "properties": {
        "instance": {
          "type": "string"
        },
        "general": {
          "$ref": "#/general"
        },
        "processing": {
          "$ref": "#/processing"
        },
        "requirements": {
          "$ref": "#/requirements"
        },
        "configuration": {
          "$ref": "#/configuration"
        },
        "client-assistant": {
          "$ref": "#/client-assistant"
        },
        "fail-over": {
          "$ref": "#/fail-over"
        },
        "monitoring": {
          "$ref": "#/monitoring"
        },
        "reporting": {
          "$ref": "#/reporting"
        },
        "notification": {
          "$ref": "#/monitoring"
        },
        "security": {
          "$ref": "#/security"
        },
        "blacklist": {
          "type": "array",
```

TABLE 28-continued

```
        "uniqueItems": true,
        "minItems": 1,
        "item": {
            "type": "string",
            "enum:": ["requirement", "client-assistant",
                "fail-over", "monitoring", "reporting",
                "notification", "security"]
          }
        }
      }
    }
  ]
}
```

Embodiments may add a simple array of list of descriptors that are excluded for each function instance, as shown in Table 28.

TABLE 28

Processing parameters

| Name | Definition | Unit | Type | Valid range |
|---|---|---|---|---|
| keywords | list of keywords that can be used to execute a search in the Function Repository | N/A | array of string | N/A |
| start-time | resource's start time | As defined by RFC3339, section 5.6 | string | N/A |
| is-dynamic | flag indicating whether the image is static or dynamic. A value of 'true' indicates the image is built dynamically. The default value is 'false' (static image). | N/A | boolean | N/A |
| url | pointer to the resource implementation, according to IETF RFC3986 | N/A | string | N/A |
| os | operation system | N/A | string | N/A |
| version | version number of operation system | N/A | string | N/A |
| architecture | hardware architecture | N/A | string | N/A |
| environment | environment | N/A | string | N/A |
| patch-url | URL (according to IETF RFC3986) defining the patching scheme for this image | N/A | string | N/A |
| scheme | URL (according to IETF RFC3986) defining information object scheme or information needed for dynamic build | N/A | string | N/A |
| co-located | Specifies the deployment of the 2 connected tasks. When the value is True, the 2 tasks shall be deployed into the same MPE, Otherwise, the deployment is determined by the Workflow Manager based on available resources. The default is 'false'. | N/A | boolean | N/A |
| id | specifies Function's id | N/A | string | N/A |
| instance | specifies identifier for one Instance of a Function. An Instance of a Function shall have unique restrictions in a Function Group. This identifier shall be unique for each Instance in the same Function Group. | N/A | string | N/A |
| port-name | specifies Function's logic port name | N/A | string | N/A |
| blacklist | specifies the descriptors that are excluded for this function instance. | N/A | Array of string | N/A |

Note:
If a Function is used more than once in one Function Group with identical restrictions, these restrictions can be defined by one Instance of that Function.

This modification may provide several benefits. For example:
1. It works on the function instance rather than a function. In a workflow, a function instance can be blacklisted and not all instances of that function.
2. The function-restriction already lists different descriptors. If a descriptor is desired to be blackout for a function instance, it can be flagged in that array.
3. Since blackout is a single parameter, there is no need of having a separate descriptor for defining it.
4. If the WDD doesn't have the workflow, the WDD can derive the workflow and provide it back to NBMP in updated WDD. Then the NBMP source can add blackout flags to the desired function instances/tasks.

Embodiments may relate to method for excluding any descriptor in a Workflow Description Document (WDD) from a function instance wherein that function instance does not have to implement that specific descriptor, wherein each function instance may have own exclusion list, while other function instances of the same function may or may not have same exclusion wherein the NBMP Source can provide the exclusion list in the WDD when the workflow is provided, or if the workflow is not provided, the Workflow Manager can derive the workflow and provide it to NBMP Source and then the NBMP source updates the WDD with the exclusion list for each function instance/task and provide it back to the Workflow Manager to implement.

[Example Process]

Figure 8:
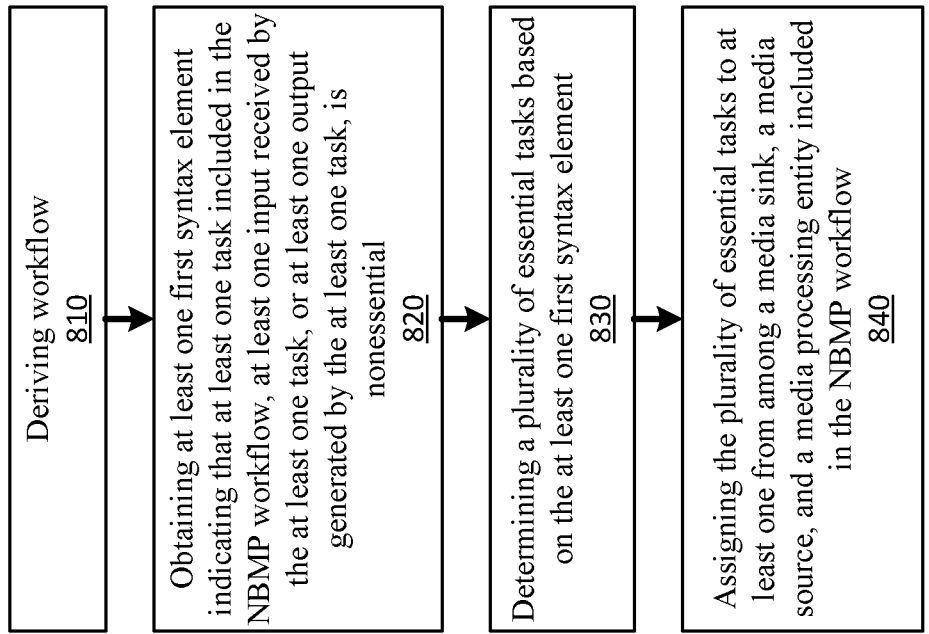
FIG. 8 is a block diagram of an example of a workflow management process according to embodiments.

With reference to FIGS. 3 and 8, a process 800 performed by the NBMP workflow manager 320 for split-rendering of a workflow is described below.

FIG. 8 is a flowchart is a flowchart of an example process 800 for reconstructing a current Network Abstraction Layer (NAL) unit for video decoding.

As shown in FIG. 8, process 800 may include deriving a network based media processing (NBMP) workflow (block 810).

As further shown in FIG. 8, process 800 may include obtaining at least one first syntax element indicating that at least one task included in the NBMP workflow, at least one input received by the at least one task, or at least one output generated by the at least one task, is nonessential (block 820).

As further shown in FIG. 8, process 800 may include determining a plurality of essential tasks based on the at least one first syntax element (block 830).

As further shown in FIG. 8, process 800 may include assigning the plurality of essential tasks to at least one from among a media sink, a media source, and a media processing entity included in the NBMP workflow (block 840).

In embodiments, the at least one first syntax element may include a first flag included in a general descriptor of the at least one task, and the first flag may indicate that the at least one task is nonessential. In embodiments, the first flag may correspond to nonessential flag of Table 1.

In embodiments, the plurality of essential tasks may be determined based on the first flag.

In embodiments, the at least one first syntax element may include a first parameter included in an output descriptor of the at least one output, and the first parameter may indicate that the at least one output is nonessential. In embodiments, the first parameter may correspond to the nonessentiality parameter of Table 3.

In embodiments, the plurality of essential tasks may be determined based on the first parameter.

In embodiments, process 800 may further include obtaining a step descriptor including at least one second syntax element indicating parallel processing information of at least one media segment associated with the NBMP workflow; and assigning the plurality of essential tasks based on the parallel processing information.

In embodiments, the at least one second syntax element may include a second flag indicating that durations of media segments may vary, and a second parameter indicating a maximum duration of the durations. In embodiments, the second flag may correspond to the element "variable duration" described above, and the second parameter may correspond to the element "segment-duration" described above.

In embodiments, the at least one second syntax element may include a third parameter that indicates at least one of a temporal overlap of the at least one media segment, a number of dimensions of the at least one media segment, a description of the dimensions of the at least one media segment, or an overlap of the dimensions of the at least one media segment. In embodiments, the third parameter may correspond to at least one of the parameters shown in Table 21.

In embodiments, process 800 may further include obtaining a function restrictions list corresponding to an instance of a function included in the NBMP workflow. In embodiments, the function restrictions list may indicate restrictions of a corresponding function. In embodiments, the function restrictions list may include a blacklist array that specifies descriptors excluded for the instance of the function in a workflow description document corresponding to the NBMP workflow.

In embodiments, the function restrictions list may be a first function restrictions list, and the instance of the function may be a first instance of the function, and a second function restrictions list corresponding to a second instance of the function may not include the blacklist array.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

[Example Computer Code]

According to embodiments of the present disclosure, at least one processor with memory storing computer code may be provided. The computer code may be configured to, when executed by the at least one processor, perform any number of aspects of the present disclosure.

Figure 9:
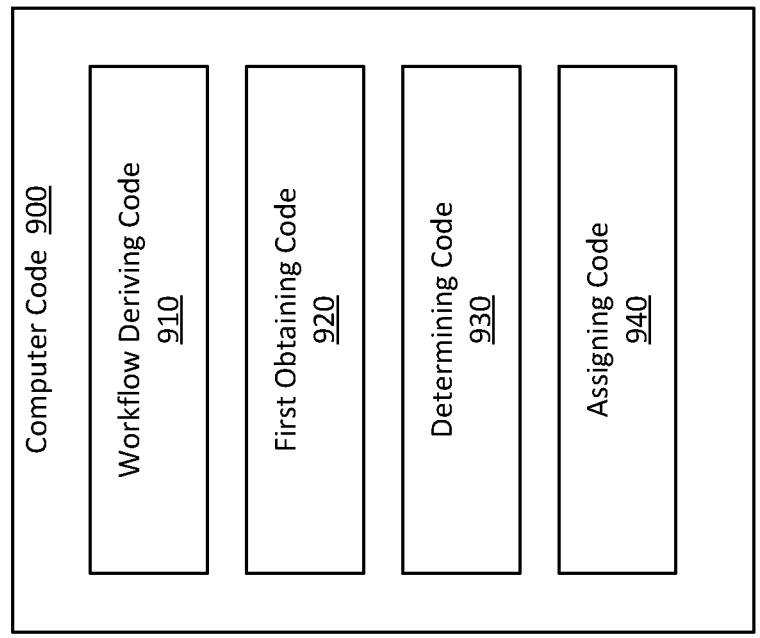
FIG. 9 is a block diagram of an example of computer code according to embodiments.

For example, with reference to FIG. 9, computer code 900 may be implemented in the NBMP system 300. For example, the computer code may be stored in memory of the NBMP workflow manager 320 and may be executed by at least one processor of the NBMP workflow manager 320. The compute code may comprise, for example, workflow deriving code 910, first obtaining code 920, determining code 930, and assigning code 940.

The workflow deriving code 910, first obtaining code 920, determining code 930, and assigning code 940 may be configured to cause the NBMP workflow manager 320 to perform the aspects of the process described above with reference to FIG. 8, respectively.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method performed by at least one processor, the method comprising:
   deriving a network based media processing (NBMP) workflow;
   obtaining at least one first syntax element indicating that at least one task included in the NBMP workflow, at least one input received by the at least one task, or at least one output generated by the at least one task, is nonessential;
   determining a plurality of essential tasks based on the at least one first syntax element;
   assigning the plurality of essential tasks to at least one from among a media sink, a media source, and a media processing entity included in the NBMP workflow; and
   obtaining a step descriptor including at least one second syntax element indicating parallel processing information of at least one media segment associated with the NBMP workflow,
   wherein the assigning comprises assigning the plurality of essential tasks based on the parallel processing information, and
   wherein the at least one second syntax element comprises a second flag indicating that durations of media segments may vary, and a second parameter indicating a maximum duration of the durations.

2. The method of claim 1, wherein the at least one first syntax element comprises a first flag included in a general descriptor of the at least one task, and
   wherein the first flag indicates that the at least one task is nonessential.

3. The method of claim 2, wherein the plurality of essential tasks are determined based on the first flag.

4. The method of claim 1, wherein the at least one first syntax element comprises a first parameter included in an output descriptor of the at least one output, and
   wherein the first parameter indicates that the at least one output is nonessential.

5. The method of claim 4, wherein the plurality of essential tasks are determined based on the first parameter.

6. The method of claim 1, wherein the at least one second syntax element comprises a third parameter that indicates at least one of a temporal overlap of the at least one media segment, a number of dimensions of the at least one media segment, a description of the dimensions of the at least one media segment, or an overlap of the dimensions of the at least one media segment.

7. The method of claim 1, further comprising obtaining a function restrictions list corresponding to an instance of a function included in the NBMP workflow,
   wherein the function restrictions list includes a blacklist array that specifies descriptors excluded for the instance of the function in a workflow description document corresponding to the NBMP workflow.

8. The method of claim 7, wherein the function restrictions list is a first function restrictions list, and the instance of the function is a first instance of the function, and
   wherein a second function restrictions list corresponding to a second instance of the function does not include the blacklist array.

9. A workflow manager of a media system, the workflow manager comprising:
   at least one processor; and
   memory comprising computer code, the computer code comprising:
   workflow deriving code configured to cause the at least one processor to derive a network based media processing (NBMP) workflow;
   first obtaining code configured to cause the at least one processor to obtain at least one first syntax element indicating that at least one task included in the NBMP workflow, at least one input received by the at least one task, or at least one output generated by the at least one task, is nonessential;
   determining code configured to cause the at least one processor to determine a plurality of essential tasks based on the at least one first syntax element;
   assigning code configured to cause the at least one processor to assign the plurality of essential tasks to at least one from among a media sink, a media source, and a media processing entity included in the NBMP workflow; and
   second obtaining code configured to cause the at least one processor to obtain a step descriptor including at least one second syntax element indicating parallel processing information of at least one media segment associated with the NBMP workflow,
   wherein the assigning code is further configured to cause the at least one processor to assign the plurality of essential tasks based on the parallel processing information, and
   wherein the at least one second syntax element comprises a second flag indicating that durations of media segments may vary, and a second parameter indicating a maximum duration of the durations.

10. The workflow manager of claim 9, wherein the at least one first syntax element comprises a first flag included in a general descriptor of the at least one task, and
    wherein the first flag indicates that the at least one task is nonessential.

11. The workflow manager of claim 10, wherein the determining code is further configured to cause the at least one processor to determine the plurality of essential tasks based on the first flag.

12. The workflow manager of claim 9, wherein the at least one first syntax element comprises a first parameter included in an output descriptor of the at least one output, and
    wherein the first parameter indicates that the at least one output is nonessential.

13. The workflow manager of claim 12, wherein the determining code is further configured to cause the at least one processor to determine the plurality of essential tasks based on the first parameter.

14. The workflow manager of claim 9, wherein the at least one second syntax element comprises a third parameter that indicates at least one of a temporal overlap of the at least one media segment, a number of dimensions of the at least one media segment, a description of the dimensions of the at least one media segment, or an overlap of the dimensions of the at least one media segment.

15. The workflow manager of claim 9, wherein the computer code further comprises third obtaining code configured to cause the at least one processor to obtain a first function restrictions list corresponding to a first instance of a function included in the NBMP workflow,
    wherein the first function restrictions list includes a blacklist array that specifies descriptors excluded for the first instance of the function in a workflow description document corresponding to the NBMP workflow, and wherein a second function restrictions list corresponding to a second instance of the function does not include the blacklist array.

16. A non-transitory computer-readable medium storing computer code that is configured to, when executed by at least one processor that implements a workflow manager of a media system, cause the at least one processor to:

derive a network based media processing (NBMP) workflow;

obtain at least one first syntax element indicating that at least one task included in the NBMP workflow, at least one input received by the at least one task, or at least one output generated by the at least one task, is nonessential;

determine a plurality of essential tasks based on the at least one first syntax element;

assign the plurality of essential tasks to at least one from among a media sink, a media source, and a media processing entity included in the NBMP workflow; and obtain a step descriptor including at least one second syntax element indicating parallel processing information of at least one media segment associated with the NBMP workflow, wherein the computer code is configured to, when executed by the at least one processor, cause the at least one processor to assign the plurality of essential tasks based on the parallel processing information, and wherein the at least one second syntax element comprises a second flag indicating that durations of media segments may vary, and a second parameter indicating a maximum duration of the durations.

* * * * *